(12) United States Patent
Yeh et al.

(10) Patent No.: US 8,203,792 B2
(45) Date of Patent: Jun. 19, 2012

(54) PROJECTION LENS

(75) Inventors: Chao-Yi Yeh, Miao-Li Hsien (TW);
Jyh-Long Chern, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 72 days.

(21) Appl. No.: 12/888,385

(22) Filed: Sep. 22, 2010

(65) Prior Publication Data
US 2012/0044584 A1    Feb. 23, 2012

(30) Foreign Application Priority Data
Aug. 18, 2010    (TW) ............................... 99127515 A

(51) Int. Cl.
*G02B 3/00*    (2006.01)
(52) U.S. Cl. ....................................... 359/649; 359/650

(58) Field of Classification Search ........... 359/649–651
See application file for complete search history.

(56) References Cited

U.S. PATENT DOCUMENTS

| | | | | |
|---|---|---|---|---|
| 4,682,861 A * | 7/1987 | Hosoya | ......................... | 359/650 |
| 5,633,757 A * | 5/1997 | Park | .............................. | 359/650 |
| 6,297,860 B1 * | 10/2001 | Moskovich | ................... | 348/781 |
| 6,791,629 B2 * | 9/2004 | Moskovich et al. | .......... | 348/779 |
| 7,133,084 B2 * | 11/2006 | Moskovich et al. | .......... | 348/779 |

* cited by examiner

*Primary Examiner* — James Greece
(74) *Attorney, Agent, or Firm* — Altis Law Group, Inc.

(57) ABSTRACT

A projection lens comprises, from a long conjugate side to a short conjugate side, a first lens unit with positive optical power, a second lens unit with negative optical power, and a third lens unit with negative optical power. The first lens unit is configured for correcting chromatic aberration of the projection lens. The third lens unit comprises a meniscus lens which is convex toward to the short conjugate side of the projection lens.

7 Claims, 1 Drawing Sheet

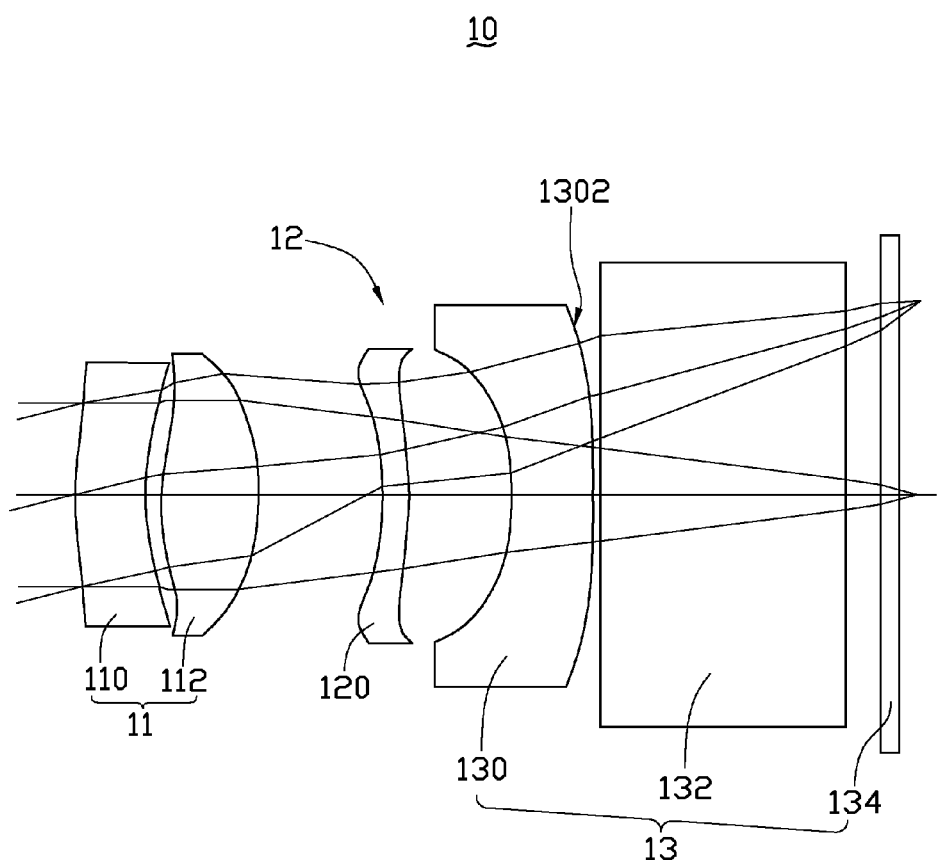

PROJECTION LENS

BACKGROUND

1. Technical Field

The present disclosure generally relates to lenses and particularly, to a projection lens for projection apparatus.

2. Description of Related Art

Lenses are usually employed in projectors, such as digital light processing (DLP) projectors, liquid crystal display (LCD) projectors, etc. In the design of above-mentioned projection systems, high resolution, low distortion, lateral chromatic aberration correction are always major concerns.

Therefore, what is needed is a projection lens capable of achieving high resolution, low distortion and lateral chromatic aberration correction.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the disclosure. Moreover, in the drawing, like reference numerals designate corresponding parts throughout the whole view.

The only drawing is a schematic isometric view of a projection lens, according to an exemplary embodiment.

DETAILED DESCRIPTION

Reference will now be made to the drawing to describe the present projection lens, in detail.

Referring to FIG. 1, a projection lens 10 according to an exemplary embodiment is provided. The projection lens 10 includes, from a long conjugate side to a short conjugate side, a first lens unit 11 with positive optical power, a second lens unit 12 with negative optical power, and a third lens unit 13 with negative optical power.

The first lens unit 11 is configured for correcting chromatic aberration of the projection lens 10. The first lens unit 11 includes at least one lens with positive optical power. In present embodiment, the first lens unit 11 includes two lenses 110, 112. Each of the lenses 110, 112 can be a resin complex lens or a glass lens. In a still further embodiment, at least one lens of the first lens unit 11 has an aspherical lens surface.

The second lens unit 12 includes at least one lens with negative optical power. In present embodiment, the second lens unit 12 includes a solely lens 120. The lens 120 has a negative optical power and can be a resin complex lens or a glass lens.

The third lens unit 13 includes at least one meniscus lens 130. The meniscus lens 130 has a convex surface 1302 facing toward to the short conjugate side of the projection lens 10 (right side in FIG. 1). The meniscus lens 130 can be a resin complex lens or a glass lens. In present embodiment, the meniscus lens 130 has a negative optical power; the third lens unit 13 further includes two plate-like lenses 132, 134. The plate-like lens 132, 134 are actually light transmissive/transparent plates. Each of the plate-like lens 132, 134 can be a resin complex lens or a glass lens.

The projection lens 10 satisfies conditions:

$$0.1 < f_2/f_3 < 0.4; \quad (1)$$

$$0.6 < f_1/f < 0.9; \quad (2)$$

$$1.2 < BFL/h < 1.6; \quad (3)$$

$$0.7 < f/BFL < 1.2; \quad (4)$$

wherein f represents a focal length of the projection lens 10, $f_1$ represents a focal length of the first lens unit 11, $f_2$ represents a focal length of the second lens unit 12, $f_3$ represents a focal length of the third lens unit 13, BFL represents a back focal length of the projection lens 10, h represents an object height.

In a still further embodiment, the lenses 110, 112, 120 and 130 have an aspherical design which satisfies the following condition:

$$z = \frac{cvr^2}{1 + \sqrt{1 - cv^2(cc+1)r^2}} + \sum A_i r^i; \quad (5)$$

Wherein z represents an offset of the position point that has a height of "r", cc represents a conic constant, $r = \sqrt{x^2 + y^2}$ represents a height of the lens surface relative to an optical axis of the lens, cv represents curvature of lens surface, $A_i$ (i=0, 1, 2, 3, 4, ...) represents aspherical coefficients.

In the present embodiment, the projection lens is compact and has a total track length smaller than 30 millimeters (mm).

Following tables show numerical data on the projection lens 10 and the aspherical surfaces of the lenses of each lens unit, in three exemplary embodiments, wherein F/# represents f number of the projection lens 10.

FIRST EMBODIMENT

F/#=1.8; f=11.376616; h=8.157;

| Surface No. | Curvature Radius (mm) | Thickness (mm) | Refractive Index (Nd) | Abbe Number (Vd) |
|---|---|---|---|---|
| 1 | 14.234 | 2.342 | 1.632 | 23 |
| 2 | 47.797 | 0.562 | — | — |
| 3 | 13.648 | 3.286 | 1.515 | 57 |
| 4 | −9.491 | 4.247 | — | — |
| 5 | −6.099 | 0.85 | 1.632 | 23 |
| 6 | −9.028 | 3.517 | — | — |
| 7 | −8.006 | 2.66 | 1.49 | 55.3 |
| 8 | −10.386 | 0.312 | — | — |
| 9 | ∞ | 8.3 | 1.846663 | 23.82516 |
| 10 | ∞ | 1.118 | — | — |
| 11 | ∞ | 0.7 | 1.5168 | 64.16641 |

-continued

| | | | | |
|---|---|---|---|---|
| 12 | ∞ | 0.57 | — | — |

| | coefficient | | | | |
|---|---|---|---|---|---|
| Surface No. | Conic Constant | AS2 | AS4 | AS6 | AS8 |
| 1 | −1 | 2.4453E−03 | −6.3569E−04 | −1.5620E−05 | 3.6954E−07 |
| 2 | −1 | 4.4294E−02 | −5.7179E−04 | 3.0466E−06 | −4.8113E−07 |
| 3 | 4.9937E−01 | 8.1677E−03 | −3.3687E−04 | −8.4229E−06 | −2.2051E−07 |
| 4 | 4.3571E−01 | −1.7971E−03 | −3.8787E−04 | −6.8109E−06 | −2.8356E−07 |
| 5 | −7.9807E−01 | 2.9465E−02 | 6.5424E−05 | 8.6513E−06 | 1.1306E−07 |
| 6 | −1 | 2.6423E−02 | 3.0722E−04 | 4.3321E−06 | −1.5789E−07 |
| 7 | 9.7702E−01 | 5.1571E−03 | −2.5496E−04 | −1.6613E−05 | −4.0583E−07 |
| 8 | 8.6833E−01 | 4.3026E−02 | 2.5117E−05 | −4.7659E−06 | 2.5280E−08 |

| | coefficient | | | | |
|---|---|---|---|---|---|
| Surface No. | AS10 | AS12 | AS14 | AS16 | AS18 |
| 1 | −8.7350E−08 | 1.1834E−08 | −4.4306E−11 | −9.3391E−11 | 4.4112E−12 |
| 2 | 4.6138E−08 | 1.2714E−10 | −1.1018E−10 | 3.8729E−12 | −9.2721E−14 |
| 3 | −1.0336E−08 | −4.8389E−10 | −2.3736E−11 | −1.8484E−12 | |
| 4 | −5.9867E−09 | −2.7710E−10 | −1.1169E−11 | −4.2299E−13 | −3.6578E−14 |
| 5 | −3.7593E−10 | 5.0030E−10 | 3.6302E−11 | 2.3510E−12 | 4.5496E−16 |
| 6 | 6.9475E−09 | 2.5442E−10 | 2.6659E−11 | 7.5296E−14 | 7.8365E−14 |
| 7 | −5.4313E−09 | −7.9895E−13 | 1.3844E−11 | 1.6121E−13 | −4.1741E−14 |
| 8 | 1.2623E−09 | 3.8849E−11 | −8.5770E−14 | −3.1292E−14 | 3.1825E−16 |

SECOND EMBODIMENT

F/#=1.8; f=11.522486; h=8.155;

| Surface No. | Curvature Radius (mm) | Thickness (mm) | Refractive Index (Nd) | Abbe Number (Vd) |
|---|---|---|---|---|
| 1 | 14.441 | 2.372 | 1.632 | 23 |
| 2 | 47.994 | 0.554 | — | — |
| 3 | 13.358 | 3.441 | 1.515 | 57 |
| 4 | −9.498 | 4.091 | — | — |
| 5 | −6.124 | 0.943 | 1.632 | 23 |
| 6 | −8.919 | 3.402 | — | — |
| 7 | −8.197 | 2.833 | 1.49 | 55.3 |
| 8 | −10.451 | 0.376 | — | — |
| 9 | ∞ | 8.3 | 1.846663 | 23.82516 |
| 10 | ∞ | 1.154 | — | — |
| 11 | ∞ | 0.7 | 1.5168 | 64.16641 |
| 12 | ∞ | 0.47 | — | — |

| | coefficient | | | | |
|---|---|---|---|---|---|
| Surface No. | Conic Constant | AS2 | AS4 | AS6 | AS8 |
| 1 | −1 | 2.1810E−03 | −6.7541E−04 | −1.7138E−05 | 3.8569E−07 |
| 2 | −1 | 4.3990E−02 | −6.1575E−04 | 1.3047E−06 | −5.0963E−07 |
| 3 | 4.9937E−01 | 1.0051E−02 | −2.5902E−04 | −8.7817E−06 | −3.4374E−07 |
| 4 | 4.3571E−01 | −6.6199E−04 | −4.1628E−04 | −6.2885E−06 | −3.0441E−07 |
| 5 | −7.9807E−01 | 2.8490E−02 | 1.7830E−04 | 1.4692E−05 | 2.4980E−07 |
| 6 | −1 | 2.6846E−02 | 3.0785E−04 | 5.1773E−06 | 1.3528E−08 |
| 7 | 9.7702E−01 | 7.6844E−03 | −3.5788E−04 | −1.8393E−05 | −4.3014E−07 |
| 8 | 8.6833E−01 | 4.7673E−02 | −3.2845E−05 | −6.1417E−06 | 2.0245E−08 |

| | coefficient | | | | |
|---|---|---|---|---|---|
| Surface No. | AS10 | AS12 | AS14 | AS16 | AS18 |
| 1 | −8.3926E−08 | 1.2226E−08 | −9.5430E−12 | −9.3945E−11 | 4.0828E−12 |
| 2 | 4.3059E−08 | −2.1239E−10 | −1.3136E−10 | 3.0545E−12 | −1.0639E−13 |
| 3 | −1.4765E−08 | −6.6260E−10 | −4.1040E−11 | −3.4662E−12 | |
| 4 | −9.4946E−09 | −3.9722E−10 | −1.0875E−11 | −2.2473E−13 | −2.9585E−14 |

-continued

| | | | | | |
|---|---|---|---|---|---|
| 5 | 4.4685E−09 | 1.0664E−09 | 7.8203E−11 | 3.4712E−12 | −1.6497E−13 |
| 6 | 1.8707E−08 | 5.6305E−10 | 2.1470E−11 | −6.9443E−13 | 8.1342E−14 |
| 7 | −3.2339E−09 | 1.9523E−10 | 2.3229E−11 | 3.0763E−13 | −6.6451E−14 |
| 8 | 1.2799E−09 | 3.4219E−11 | −3.7052E−13 | −3.8851E−14 | 4.9396E−16 |

THIRD EMBODIMENT

F/#=1.8; f=11.376616; h=8.157;

| Surface No. | Curvature Radius (mm) | Thickness (mm) | Refractive Index (Nd) | Abbe Number (Vd) |
|---|---|---|---|---|
| 1 | 14.452 | 2.416 | 1.632 | 23 |
| 2 | 46.697 | 0.555 | — | — |
| 3 | 13.395 | 3.493 | 1.53 | 56 |
| 4 | −9.534 | 4.040 | — | — |
| 5 | −6.107 | 0.944 | 1.632 | 23 |
| 6 | −8.965 | 3.351 | — | — |
| 7 | −8.479 | 2.921 | 1.515 | 57 |
| 8 | −10.300 | 0.377 | — | — |
| 9 | ∞ | 8.3 | 1.846663 | 23.82516 |
| 10 | ∞ | 1.137 | — | — |
| 11 | ∞ | 0.7 | 1.5168 | 64.16641 |
| 12 | ∞ | 0.486 | — | — |

| | | coefficient | | | |
|---|---|---|---|---|---|
| Surface No. | Conic Constant | AS2 | AS4 | AS6 | AS8 |
| 1 | −1 | 2.2036E−03 | −6.8641E−04 | −1.7292E−05 | 3.8827E−07 |
| 2 | −1 | 4.4491E−02 | −6.2234E−04 | 6.2064E−07 | −5.0752E−07 |
| 3 | 4.9937E−01 | 9.9005E−03 | −2.5465E−04 | −9.2152E−06 | −3.9407E−07 |
| 4 | 4.3571E−01 | −2.3360E−04 | −4.3301E−04 | −6.1562E−06 | −2.9494E−07 |
| 5 | −7.9807E−01 | 2.8047E−02 | 1.7481E−04 | 1.6207E−05 | 3.2102E−07 |
| 6 | −1 | 2.7475E−02 | 3.7862E−04 | 6.5499E−06 | 6.8600E−08 |
| 7 | 9.7702E−01 | 9.7450E−03 | −3.8282E−04 | −1.9139E−05 | −4.3964E−07 |
| 8 | 8.6833E−01 | 4.9428E−02 | −1.2449E−04 | −6.6670E−06 | 2.3253E−08 |

| | coefficient | | | | |
|---|---|---|---|---|---|
| Surface No. | AS10 | AS12 | AS14 | AS16 | AS18 |
| 1 | −8.3740E−08 | 1.2230E−08 | −8.4647E−12 | −9.3931E−11 | 4.0616E−12 |
| 2 | 4.3814E−08 | −2.1120E−10 | −1.3369E−10 | 2.8746E−12 | −1.1705E−13 |
| 3 | −1.5852E−08 | −6.3044E−10 | −3.8929E−11 | −3.5261E−12 | |
| 4 | −9.8891E−09 | −4.1658E−10 | −1.0270E−11 | −1.2057E−13 | −2.2671E−14 |
| 5 | 7.4375E−09 | 1.2802E−09 | 9.3139E−11 | 3.8238E−12 | −2.4977E−13 |
| 6 | 2.3354E−08 | 8.1545E−10 | 2.7662E−11 | −8.9252E−13 | 6.0568E−14 |
| 7 | −1.6495E−09 | 3.5663E−10 | 2.9897E−11 | 2.9922E−13 | −9.7967E−14 |
| 8 | 1.5821E−09 | 3.5602E−11 | −5.7088E−13 | −4.5204E−14 | 5.9727E−16 |

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A projection lens comprising, from a long conjugate side to a short conjugate side, a first lens unit with positive optical power, a second lens unit with negative optical power, and a third lens unit with negative optical power, wherein
the first lens unit is configured for correcting chromatic aberration of the projection lens;
the third lens unit comprises a meniscus lens which is convex toward to the short conjugate side of the projection lens;

the projection lens satisfies conditions:

$$0.1 < f_2/f_3 < 0.4; \quad (1)$$

$$0.6 < f_1/f < 0.9; \quad (2)$$

$$1.2 < BFL/h < 1.6; \quad (3)$$

$$0.7 < f/BFL < 1.2; \quad (4)$$

wherein f represents a focal length of the projection lens, $f_1$ represents a focal length of the first lens unit, $f_2$ represents a focal length of the second lens unit, $f_3$ represents a focal length of the third lens unit, BFL represents a back focal length of the projection lens, h represents an object height.

2. The projection lens according to claim 1, wherein the first lens unit comprises two lenses, and at least one of the two lenses has a positive optical power.

3. The projection lens according to claim 2, wherein at least one lens of the first lens unit has an aspherical lens surface.

4. The projection lens according to claim 2, wherein the second lens unit comprises a lens with negative optical power.

5. The projection lens according to claim 4, wherein the third lens unit comprise a meniscus lens with negative optical power and convex toward to the short conjugate side of the projection lens.

6. The projection lens according to claim 5, wherein the lenses of the first lens unit, the second lens unit and the third lens unit satisfy condition:

$$z = \frac{cvr^2}{1+\sqrt{1-cv^2(cc+1)r^2}} + \sum A_i r^i; \quad (5)$$

wherein z represents an offset of the position point that has a height of "r", cc represents a conic constant, $r=\sqrt{x^2+y^2}$ represents a height of the lens surface relative to an optical axis of the lens, cv represents curvature of lens surface, Ai (i=0, 1, 2, 3, 4, . . . ) represents aspherical coefficients.

7. The projection lens according to claim 1, wherein the projection lens has a total track length smaller than 30 millimeters.

* * * * *